United States Patent [19]

Pesonen et al.

[11] Patent Number: 5,040,712

[45] Date of Patent: Aug. 20, 1991

[54] MOUNTING SYSTEM FOR CAR TELEPHONE

[75] Inventors: Antero V. Pesonen, Salo; Jouko K. Kotitalo, Halikko, both of Finland

[73] Assignee: Nokia Mobile Phones Ltd., Salo, Finland

[21] Appl. No.: 473,672

[22] Filed: Feb. 1, 1990

[30] Foreign Application Priority Data

Feb. 3, 1989 [FI] Finland ................................ 890541

[51] Int. Cl.⁵ ................................................ B60R 7/08
[52] U.S. Cl. ........................ 224/42.45 R; 379/454;
379/455; 224/42.42; 248/220.2; 248/221.3
[58] Field of Search ............... 224/311, 315, 325, 271,
224/273, 42.45 R, 42.46, 42.44, 42, 42 R, 272,
279, 312; 379/454, 455, 446, 449; 248/220.2,
223.4, 221.3, 223.3, 224.4, 224.2, 214, 477

[56] References Cited

U.S. PATENT DOCUMENTS

| | | | |
|---|---|---|---|
| 2,696,962 | 12/1954 | Goss | 248/301 X |
| 3,848,843 | 11/1974 | Levy | 248/223.4 |
| 4,366,922 | 1/1983 | Levine et al. | 248/224.2 |
| 4,417,373 | 11/1983 | Keglewitsch | 248/224.2 |
| 4,472,606 | 9/1984 | Krulopp et al. | 248/221.3 |
| 4,611,734 | 9/1986 | Luecking et al. | 224/42.42 |
| 4,617,430 | 10/1986 | Bryant | 224/42.42 |
| 4,783,110 | 11/1988 | Beukema et al. | 224/311 |
| 4,797,916 | 1/1989 | Kojima | 371/454 |
| 4,826,119 | 5/1989 | Gresens et al. | 248/223.3 |
| 4,842,174 | 6/1989 | Sheppard et al. | 224/42.45 R |
| 4,930,694 | 6/1990 | Yoshitake et al. | 224/42.45 R |
| 4,945,561 | 7/1990 | Rioux, Jr. | 379/454 |

FOREIGN PATENT DOCUMENTS

| | | | |
|---|---|---|---|
| 64-1450 | 1/1989 | Japan | 224/42.45 R |
| 2047519 | 12/1980 | United Kingdom | 248/221.3 |

Primary Examiner—Henry J. Recla
Assistant Examiner—Glenn T. Barrett
Attorney, Agent, or Firm—Darby & Darby

[57] ABSTRACT

A mounting system for a car telephone apparatus, by the aid of which a holder of an operating component of the apparatus, a separate holder, etc. can be mounted on a vehicle wihtout using any tools, comprises a mounting shoe (1) provided with flutes (2,3) and a partly grooved central portion, and a mounting piece (6) is provided with flanges (16,10) fitting said flutes (2,3) and a plate spring (8) for engaging the grooved central portion and thereby securing the coupling of the mounting shoe (1) and the mounting piece (6).

9 Claims, 3 Drawing Sheets

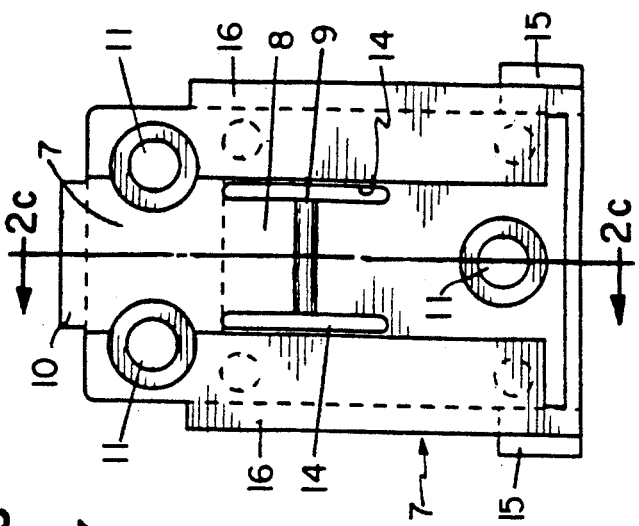
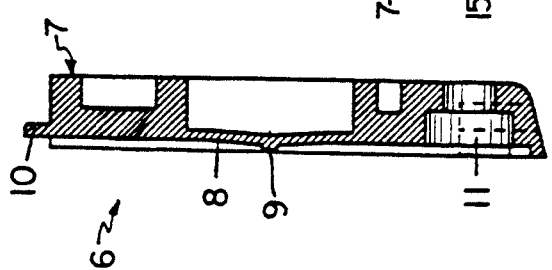
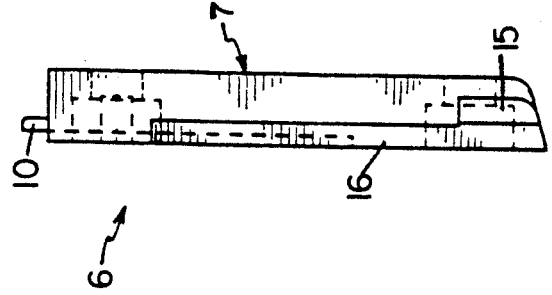
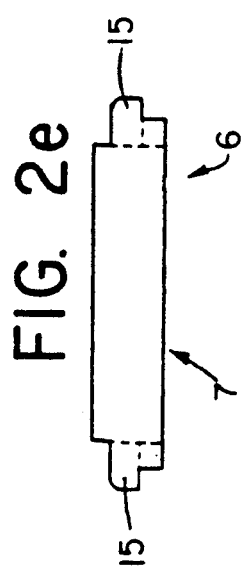
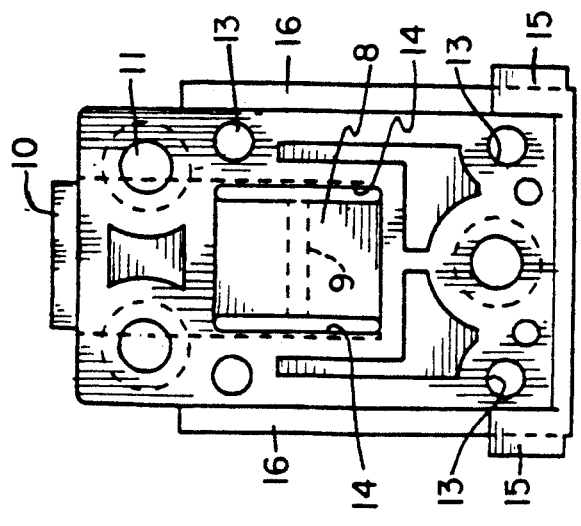

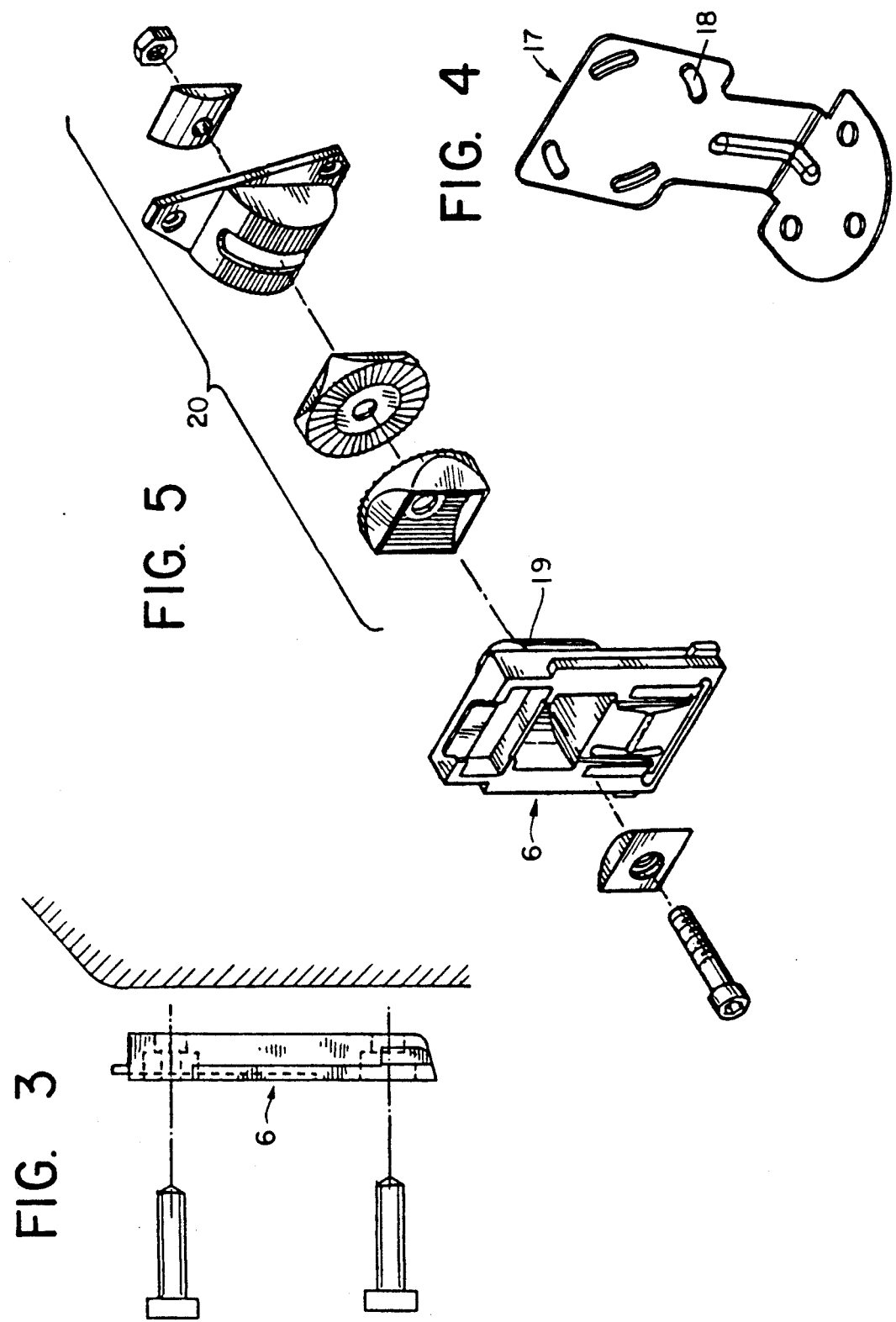

MOUNTING SYSTEM FOR CAR TELEPHONE

BACKGROUND OF THE INVENTION

The present invention concerns a system by which various car telephone apparatus can flexibly be deposited in and detached from a vehicle without using any instruments. The system is modular in that in the same attaching member can any means, if desired, be deposited.

Usually a car telephone means, for instance the holder of an operating means, a hand-free loudspeaker housing, a car telephone rack, a separate holder or other means is mounted fixedly. On the holder affixed on the mounting surface, a car telephone or a separate holder is deposited with screw fastening, whereby detaching the means is difficult and time consuming. In certain situations it is necessary to detach all car radio telephone apparatus quickly from the vehicle. This is particularly the case when one desires to prevent the apparatus from being stolen; also in servicing quick detaching is advantageous.

SUMMARY OF THE INVENTION

The object of the present invention is to provide a depositing system which enables easy and quick depositing and detaching of a car telephone apparatus without using any instruments and which enables the use of identical components for different means. As is understood in the invention, the system comprises a mounting shoe, which may be a separate component to be attached to the means, or it may also be a part of its shell, a mounting piece, to which the mounting shoe is attached with one motion, and a mounting component, by means of which the mounting piece is affixed to the surface to be mounted. The mounting piece can be articulate so that it enables selection of a relative position of the mounting component in relation to the surface to be mounted. The mounting piece can be attached directly to the surface, also without a mounting component.

The mounting shoe is a rectangular body with a planar section. The surface of said planar section is provided with grooves, or respectively, with parallel ridges protruding from the surface, said ridges forming a serrated configuration in cross-section. At least two sides of the planar section are provided with an L shaped part which is fluting in cross-section so that one branch of said flute is at right angles to the planar section, and the outer branch, positioned in extension to it, is in parallel with the planar section and at a space thereabove. The mounting shoe may be fixed with screws to the means to be mounted or it may be produced as a part thereof, or the holder thereof.

The mounting component to which the mounting shoe is attached is equally a rectangular piece provided with a planar section. At least on two sides thereof, a flange section protrudes at least partially the length of one side. The flange section protrudes on the outer edge of the planar section in the direction of said plane. On the surface of the mounting component, approximately in the middle of its planar section, is provided a plate spring. The spring has a ridge running transversally to its longitudinal direction. The mounting piece can be mounted on the surface to be mounted either directly with screws, or a separate mounting part, an intermediate part may be used, to which the mounting piece is fixed or which it is a part of. The intermediate part may be an articulated component, enabling the turning of the mounting piece, and hence, of the car telephone apparatus into any arbitrary position.

BRIEF DESCRIPTION OF THE DRAWING

The invention is described more in detail referring to the figures presenting an advantageous embodiment, in which FIG. 3 shows a direct affixing of a mounting piece on the mounting surface, FIG. 4 shows a mounting component, and FIG. 5 presents a modification of the mounting component.

DESCRIPTION OF THE PREFERRED EMBODIMENTS

Figure 1B:
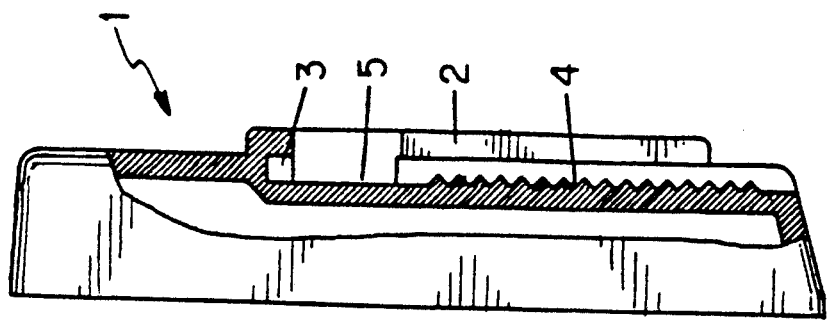
FIG. 1a presents a mounting shoe in front view, FIG. 1b the same in elevational section along the line A—A, FIG. 2a the mounting piece in rear view, FIG. 2b an end view of the mounting piece, FIG. 2c elevational section of the mounting piece along the line B—B of FIG. 2d, FIG. 2d front elevational view of the mounting piece.
Figure 1A:
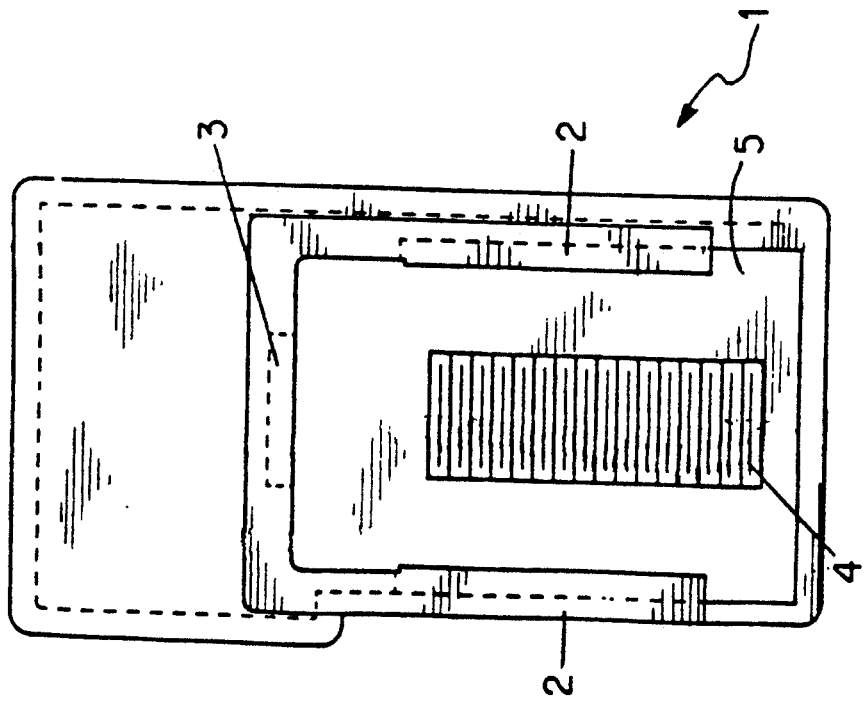

In the mounting shoe 1 presented in FIG. 1a and b can be seen a rectangular planar section 5 with a ridged area 4 in the middle. The area could also be grooved. The cross-sectional view of FIG. 1b shows that the ridges form a serrated profile. On three edges of the mounting shoe 1 is provided a fluting part of L shaped cross-section, so that a first branch of the flute projects from the planar section 5 being consistent with the normal of the surface, and the second branch, being an extension to said branch, deflects in the direction of the surface thereabove and at a space therefrom. The flute may extend on the entire length of the three edges of the planar section or a flute is provided in a certain region of each edge. FIG. 1a shows a flute 3 on a short side and flutes 2 on the sides bordering thereon. The edge part between the flutes 2 and the flute 3 is provided with a closed margin. The purpose of said design is to assure that the mounting shoe is joined with the mounting piece in a proper position.

FIGS 2a–2e present a mounting piece 6. It consists mainly of a rectangular planar part 7 of a given thickness. On two edges of said part is provided a flange 16 and on the third edge, a flange 10, said flanges extending outwards from the edge in parallel with the plane. The thicknesses and projection of said flanges are equal to the depth and height of the flutes on the sides of the mounting shoe; similarly, the breadth of the flange on the shorter side is equal to the breadth of the flute 3. At one end of the flanges 16 are provided additional flanges 15, so dimensioned as not to be able to enter the ends of the flutes 2 of the mounting shoe 1 when the mounting shoe is being urged into the mounting piece. In this manner they serve as limiters to the pushing motion.

In the mid area of the planar part 7 of the mounting piece 6 is located a plate spring 8, which is produced while the mounting piece was made. The spring is somewhat bulged outwards and a crest 9 passes across the spring. The side edges of the spring 8 are separated from the planar part 7 by slots 14, and the spring 8 is substantially coplanar with the planar part 7. The slots 14 allow the spring 8 to flex. The spring 8, except at the slots 14, is integral with the mounting piece 6. Alternatively, the spring 8 may be of metal that has been molded integrally or attached with fasteners to the planar part 7. When the mounting shoe 1 and the mounting piece are interconnected, the surface of the mounting piece 6 on which the spring 8 is located is placed against the crested surface of the mounting shoe. The mounting shoe is inserted into the mounting piece 6 in the direction of the edge on which a flange 10 is located. The flanges 16 enter the flutes 2 to guide the motion, and the crest 9 of the plate spring 8 slides from a mounting shoe ridge 4 to another. Finally, the flange 10 enters the flute 3, and at the same time, the additional flanges 15 come into contact with the end faces of the flutes 2. In this manner, the connection has been completed with a single motion. The mounting shoe and the mounting component remain reliably interconnected because of the joint operation of the flanges and the flutes, and any inadvertent detaching is prevented by the plate spring 8 which with a sufficient force holds the crest 9 disposed in the valley between the ridges 4. For affixing the mounting piece 6, said piece is provided with holes for fixing screws. The mounting piece may, e.g. with holes 11, be mounted directly to the mounting surface as is shown in FIG. 3. In FIG. 2c it is seen that the screws are affixed on the side facing the mounting shoe. For the heads of the fixing screws a recess has been provided on the surface. The mounting piece may also be attached to a separate mounting section, for instance to a connector 17 presented in FIG. 4, which in turn is attached to the mounting surface. The connector 17 is provided with slots 18 for four screws. These screws are on the side of the connector affixed to the mounting piece, which for said purpose is provided with recessed helical parts 13. The mounting piece may also be attached to the mounting surface by means of an articulated part which enables turning of the mounting piece freely relative to the mounting surface. A schematical presentation thereof is shown in FIG. 5. Hereby, a curved portion 19 is produced in the mounting piece 6, serving as a response surface for the articulated parts. Said articulated parts are described more in detail in the Finnish patent application FI-890539, Nokia-Mobira.

The mounting system of the invention enables a quick depositing of a car telephone apparatus and its detachment from a vehicle. The system may be made modular in that on all apparatus, the above described mounting shoe is already mounted at the factory, or it can be produced to be part of the shell of the means. With a separate mounting component, by which a mounting piece has been attached to the mounting surface of the vehicle, the means is turnable while being mounted in place into ergonomically desirable position. The shape of the mounting piece and the mounting shoe of the invention may vary greatly within the scope of the claims. The mounting shoe and the mounting piece can advantageously be fabricated from plastic.

We claim:

1. A mounting system for a car telephone apparatus in which a car ration telephone component may be attached and detached from a vehicle without using any tools, comprising:

a mounting shoe adapted to be one of attached on a car telephone apparatus and an integrally formed part of a car telephone apparatus, said shoe including a first rectangular planar surface housing ridges, two opposed sides and two opposed ends, said ridges being serrated in cross-section, each of said two opposed sides and one of said ends having with an edge portion which is flute-like in cross-section and having two branches, one branch of said edge portion being perpendicular to said first planar surface and the other branch being connected to said first branch and parallel to said first planar surface and spaced apart from said first planar surface;

a mounting piece adapted to be mounted upon a mounting surface, said mounting piece including a second rectangular planar surface having two opposite edges and an end portion, each of said opposite edges and said end portion having a straight planar flange, wherein each of said flanges is parallel with said second planar surface and projecting outwardly from the respective edge of said second planar surface, said flanges being dimensioned to join said mounting piece to said mounting shoe by sliding engagement with said flute-like edge portions of said mounting shoe, such that, said first planar surface of said mounting shoe contacts said second planar surface of said mounting piece, said mounting piece further including a plate spring spaced from said end portion with a resilient ridge projecting therefrom, said ridge being parallel with said ridges in said mounting shoe such that said ridge is releasably engaged in one of said serrations when said shoe and mounting piece are engaged.

2. A mounting system as in claim 1, wherein said plate spring is substantially coplanar with said second planar surface of said mounting piece.

3. A mounting system as in claim 1, wherein said mounting shoe ridges are at right angles with said opposed edges, the length of said ridges being substantially less than the distance between said opposed edges.

4. A mounting system as in claim 1, wherein said plate spring is an integral portion of said mounting piece.

5. A mounting system as in claim 1, wherein said plate spring is a metallic plate spring attached to said second planar surface.

6. A mounting system as in claim 1, wherein said mounting shoe and said mounting piece are made of plastic material.

7. A mounting system as in claim 1, wherein said mounting shoe is a one piece integral construction.

8. A mounting system as in claim 1, and further comprising a separate mounting component for attachment to said mounting piece.

9. A mounting system as in claim 8, wherein said separate component may be one of a bent metal plate and an articulated component.

* * * * *